June 29, 1954          L. D. WATKINS          2,682,259
TRANSFER PASSAGE OIL TRAP FOR TWO-CYCLE ENGINES
Filed March 30, 1951          2 Sheets-Sheet 1
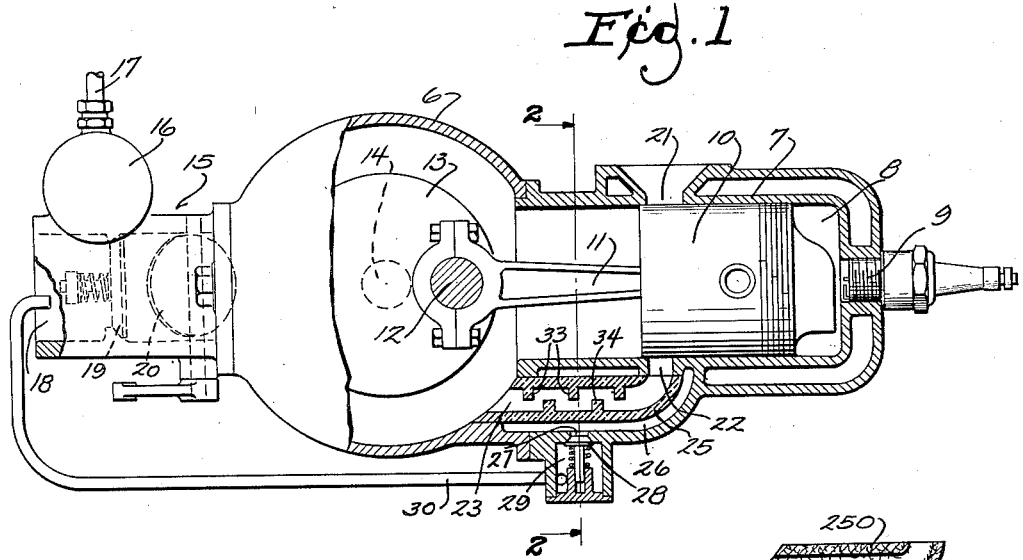
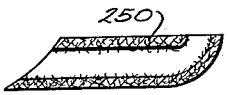
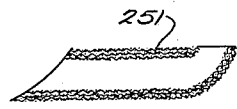
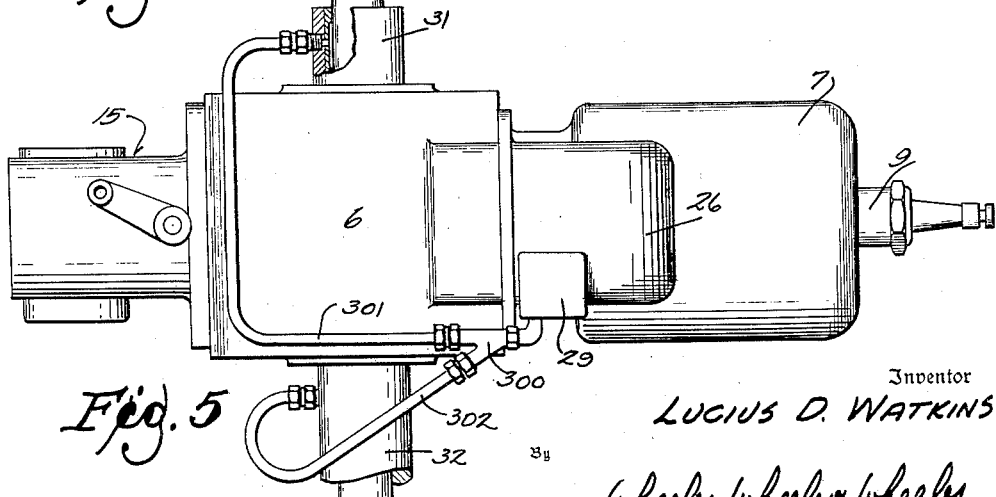
Inventor
LUCIUS D. WATKINS
Wheeler, Wheeler & Wheeler
Attorneys June 29, 1954  L. D. WATKINS  2,682,259
TRANSFER PASSAGE OIL TRAP FOR TWO-CYCLE ENGINES
Filed March 30, 1951  2 Sheets-Sheet 2

Inventor
LUCIUS D. WATKINS
By Wheeler, Wheeler & Wheeler
Attorneys

Patented June 29, 1954

2,682,259

UNITED STATES PATENT OFFICE 2,682,259

TRANSFER PASSAGE OIL TRAP FOR TWO-CYCLE ENGINES

Lucius D. Watkins, Milwaukee, Wis., assignor to Outboard, Marine & Manufacturing Company, Waukegan, Ill., a corporation of Delaware Application March 30, 1951, Serial No. 218,453

15 Claims. (Cl. 123—73)

This invention relates to a transfer passage oil trap for two-cycle engines.

In a two-cycle engine, it is conventional to mix the oil with the gasoline, the atomized oil and fuel being drawn with the air into the crank case. Ideally the oil should remain there and in the bearings when the air and fuel are compressed for transfer, at the conclusion of each expansion stroke of the piston, to the working cylinder. Very little oil, if any, is required in the combustion chamber and the oil that reaches the combustion chamber is burned with the fuel and discharged.

The present invention seeks to trap and utilize oil moving with the mixture from the crank case to the combustion chamber. It accomplishes this purpose by the use of a system including baffles in the transfer passage, a porous wall for passing captured oil from such passage to a discharge conduit through which the oil can escape when the crank case and the transfer passage are under pressure, and a check valve for assuring unidirectional flow in the direction of oil discharge. Obviously, the system should be of such a character as not to release any appreciable portion of the crank case pressure, but merely to permit the trapped oil to escape.

In the drawings:

Fig. 1 is a view partially in plan and partially in horizontal section through a two-cycle engine embodying the invention.

Fig. 2 is a view taken in cross section on the line 2—2 of Fig. 1.

Figs. 3 and 4 are fragmentary detail sectional views suggesting two of the various alternative porous materials which may be substituted for the ceramic porous wall illustrated in Fig. 1.

Fig. 5 is a view in side elevation of a two-cycle engine like that of Fig. 1 showing a different disposition of the trapped oil.

Figure 6:
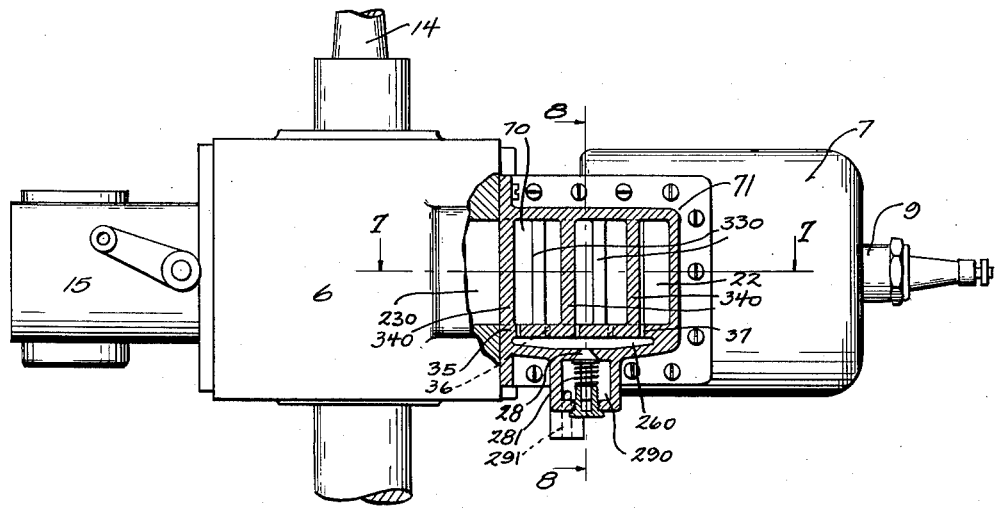
Fig. 6 is a view in side elevation of a modified embodiment of the invention, portions of the wall being broken away to a vertical section on the line 6—6 of Fig. 8.

In most respects, the engine illustrated is conventional, being merely illustrative of any type of two-cycle engine. There is a crank case at 6 with which is connected a jacketed cylinder 7 having a combustion chamber at 8 in which fuel is ignited by the spark plug 9 to force the piston 10 outwardly, the motion of the piston being communicated by connecting rod 11 to the crank 12 on the crank disk 13 of crank shaft 14.

Since the present invention is not concerned with the particular manner in which carbureted air is admitted to the crank case 6, I have illustrated only diagrammatically a carburetor 15 having a float chamber at 16 supplied with the fuel and oil mixture through pipe 17. The air admitted through port 18 passes check valve 19 and throttle valve 20 to enter the crank case 6 during the low pressure portion of the cycle when the piston 10 is moving outwardly in cylinder 7. During the expansion stroke of the piston, when the piston is moving toward the crank case 6, the valve 19 closes and when the piston 10 clears the exhaust port 21, the products of combustion are discharged. At about the same time, the piston clears the transfer port 22 allowing the compressed mixture in crank case 6 to traverse the transfer passage 23 and enter the cylinder above the piston 10 through port 22. There are various other arrangements for admitting the carbureted mixture to the crank case and for controlling the flow of such mixture from the crank case to the cylinder and it is understood that the present invention is not directed to these features but is applicable to a two-cycle engine transfer passage regardless of the design of the engine in other respects.

The particular feature with which the present invention is concerned is the provision of an oil trap through which the oil-carrying carbureted mixture must pass in reaching the cylinder. This is conveniently done by providing a porous wall at 25 for the transfer passage 23, constituting a partition between the passage and an oil-collecting chamber 26. This chamber communicates through port 27 and any suitable valve, here exemplified by a spring-loaded check valve 28, with a discharge chamber 29 from which the pipe 30 leads to any point at which the collected oil can be used or re-used. In the device shown in Fig. 1, the pipe 30 leads back to the carburetor. In the arrangement shown in Fig. 5, the corresponding pipe 300 has branches 301 and 302 leading to the upper and lower crank shaft bearings 31, 32, respectively. It is my purpose merely to illustrate the fact that there are numerous points of disposal of the oil and the present invention is not concerned so much with the point of delivery as with oil collection.

There are numerous materials suitable for the manufacture of the porous wall 25 with which the transfer passage 23 is provided. As indicated by the cross-hatching of the wall 25 in Fig. 1, the wall there shown is ceramic in character, having the same degree of porosity as a fairly open ceramic filter. The baffles 33, 34 alternately arranged in staggered locations at opposite sides of the passage 23, and preferably integral with the ceramic wall 25, serve to create turbulence and to deflect the gases and intercept and segregate droplets and minimize scouring action such as might re-entrain deposited droplets in the gas flow. The use of baffles or other means for changing the direction of flow will tend to bring entrained droplets into contact with the walls and, whether or not baffles or the like are employed, there will be a tendency for droplets encountering the walls to adhere thereto.

Due to crank case heat and pressure drop and gas velocity, the larger portion of the fuel with which the air has been carbureted will be evaporated before transfer into the cylinder occurs. Consequently, few if any of the droplets entrained in the mixture will be droplets of fuel.

At the time of transfer, the port 22 will be open and there will be little pressure in transfer passage 23. Such pressure as exists will be readily overcome by the spring which biases the valve 28 to its seat. The receiving chamber 26 being therefore closed, there will be little pressure differential between it and the transfer passage to occasion flow through the porous wall in either direction. Consequently, the only functioning of the system during this portion of the cycle will involve the trapping of the oil particles by the baffles 33 due to the rapid movement of the mixture through the transfer passage and its frequent changes of direction in such passage. The gases and vapors are more easily susceptible of change of direction than the heavier droplets of oil, the inertia of which will impel them into contact with the baffles and wall surfaces, where they will tend to cling.

As the piston 10 moves outwardly in cylinder 7 to create a partial vacuum in the crank case 6, the check valve 28 will be closed and consequently there will be little or no pressure differential which could cause an undesired reverse flow from chamber 26 into passage 23. While the oil accumulating chamber 26 has necessarily been shown as if it had relatively large capacity, its capacity will desirably be kept as low as possible to minimize the volume of gases which, remaining under pressure in this chamber, might otherwise tend to flow reversely through the porous wall into the transfer passage 23 while such passage is under partial vacuum at this part of the cycle. It is at this part of the cycle that a fresh charge of mixture is drawn from the carburetor into the crank case.

However, during the next part of the cycle when the piston 10 is moving on its expansion stroke toward the crank case, the mixture in the crank case will be highly compressed and the compression will extend into the transfer passage 23, port 22 being closed at this time. This will develop a very substantial pressure differential between the transfer port 23 and the oil collecting chamber 26, the latter being nearly at atmospheric pressure, since only the light spring of valve 28 resists the opening of such valve in response to the pressure differential thus established. As a result, the oil film spanning the pores or openings of the porous wall 25 is caused by the pressure differential to move through such wall into the collecting chamber 26 and, in the same or a subsequent cycle, through port 27 past valve 28 into the discharge chamber 29 from which the only egress is via pipe 30 in Fig. 1 or pipes 300, 301 and 302 in Fig. 5 to any suitable point of collection or discharge for use.

Instead of the ceramic wall 25, I may substitute a porous wall molded of sintered metal or glass wool, rock wool, or even animal or vegetable fiber, as indicated at 250 in Fig. 3, or even a wall of screen cloth of minute mesh, as shown on an enlarged scale at 251 in Fig. 4. The present invention is not generically concerned with the choice of materials for the porous walls, although certain materials are specifically preferred as indicated in the appended claims.

Figure 7:
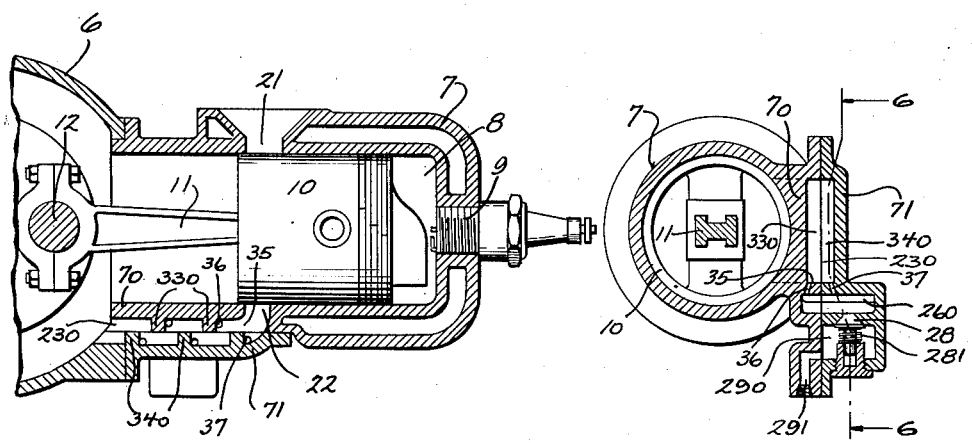
Fig. 7 is a view taken in transverse section on the line 7—7 of Fig. 6.
Figure 8:
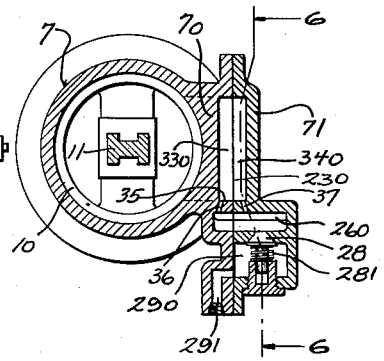
Fig. 8 is a view taken in transverse section on the line 8—8 of Fig. 6.

The degree of porosity is not critical. In the alternative construction shown in Figs. 6 to 8, the arrangement is one in which the baffles 330 are formed on the outer surface of the cylinder wall 70 with which a removable cover plate 71 cooperates to provide the transfer passage 230. The cover plate has staggered baffles at 340.

In this embodiment, porosity is provided in the bottom wall 35 of the transfer passage by boring in such wall a small opening 36 behind each of the baffles 330 and a like opening 37 behind each of the baffles 340. That is to say, the holes are located at the inner margins of the respective baffles and beyond the baffles in the direction of flow of the mixture through the passage 230. These holes or pores open into the collecting chamber 260 which lies beneath the transfer passage, being formed in part in the cylinder wall 70 and in part in the closure cap 71. The check valve 28 opens downwardly from the collecting chamber 260 against the pressure of compression spring 281 into chamber 290, from which the liquid is carried off through coupling 297 in the manner already described.

Whether the pores or holes are large or small, even the drilled holes here shown can properly be characterized as pores because they are so small that the pressure differential effecting the transfer during the brief interval when the valve is forced open is incapable of passing any substantial volume of gases other than just sufficient to effect the movement of the oil. The accumulated oil tends to obstruct the pores so that during the pressure interval it is forced through them, the pressure being relieved before much gas can follow.

In all constructions, the baffles catch the oil droplets and guide them to the discharge pores by creating relatively quiescent zones behind each baffle where the oil is removed from the path of mixture movement during transfer.

I claim:

1. In a two-cycle engine having a crank case subject intermittently to super-atmospheric pressure and a cylinder and a transfer passage leading from the crank case to the cylinder, the combination of an oil trap comprising a porous wall section for such passage, means providing a chamber about said wall section and with which the pores communicate, said means having a vent opening from said chamber and communicating with a point of lower pressure, and a valve controlling said vent and adapted to release pressure in said chamber to establish a pressure differential across said wall section for causing flow through the pores thereof in an outward direction when crank case pressure is high.

2. In a two-cycle internal combustion engine having a crank case and a cylinder and a transfer passage, the combination with means providing a collecting chamber having transfer ports communicating respectively with the crank case and the cylinder, of a porous partition wall extending across said chamber between said ports and defining a transfer passage, said collecting chamber having a collecting portion externally of said partition wall and separated thereby from said passage, said chamber being provided with a valve-controlled discharge port for collected oil.

3. The device of claim 2 in further combination with a baffle means in said passage for deflecting mixture traversing said passage.

4. The device of claim 3 in which the baffle means is integral with the wall.

5. In a two-cycle enging having a ported crank case and a ported cylinder, the combination of means including a porous wall providing a transfer passage from the port of the crank case to the port of the cylinder, and a collecting chamber wall enclosing said porous wall and partitioned by said porous wall from said transfer passage.

6. The device of claim 5 in which said porous wall comprises ceramic filter material.

7. The device of claim 5 in which said porous wall comprises fibrous material.

8. The device of claim 5 in which said wall comprises a screen.

9. The device of claim 5 in which said transfer passage forming means is provided on opposite sides with staggered baffles requiring mixture traversing said passage to follow a tortuous course therethrough tending to cause entrained oil droplets to accumulate on said porous wall.

10. In a two-cycle engine having a crank case and a cylinder and a transfer passage, the combination with passage forming means comprising a porous wall, of baffle means disposed within the passage for trapping oil particles to be discharged through the pores of said wall, means providing a collecting chamber enclosing said porous wall and partitioned by said porous wall from said passage, said collecting chamber means having a valve controlled vent, the valve having means for permitting its opening only when the pressure in the passage is higher than that externally of the vent.

11. The device of claim 10 in which the valve comprises an outwardly opening check valve.

12. The device of claim 11 in which the vent is located at the bottom of the collecting chamber in order that the oil may drain by gravity thereto and the outwardly opening valve has means biasing it to its seat and against which it is opened by pressure differential between the passage and the vent beyond the valve.

13. In a two-cycle internal combustion engine having a crank case, a cylinder and a transfer passage from the crank case to the cylinder, the combination with transfer passage forming means including a bottom wall having openings therein, of baffles disposed in the passage formed by said means in advance of the openings through said bottom wall, said baffles being adapted to screen the respective openings and to entrap whole particles to flow by gravity to and through said openings, walls providing a collecting chamber enclosing said bottom wall to be partitioned by said bottom wall from said transfer passage, and a discharge conduit from the collecting chamber opening from a lower portion thereof and provided with a controlling valve for permitting unidirectional flow outwardly from said chamber through said conduit.

14. The device of claim 13 in which the passage-forming means comprises a cylinder wall portion and a complementary cap portion, the baffles being respectively mounted in staggered relation upon the respective portions, parts of the said portions together providing said bottom wall.

15. In an internal combustion engine comprising a ported crank case and a ported cylinder, the combination with means providing a transfer passage from the port of the crank case to the port of the cylinder and including a porous wall, of a supplemental wall encircling the porous wall and defining a collecting chamber partitioned by the porous wall from said passage, said chamber defining means having a port and an outwardly opening check valve controlling discharge through said port, the valve controlled port having communication with the atmosphere whereby the opening of said valve during periods of pressure in said transfer passage will establish a pressure differential across said porous wall.

References Cited in the file of this patent

UNITED STATES PATENTS

| Number | Name | Date |
|---|---|---|
| 792,615 | Ramsey | June 20, 1905 |
| 972,409 | Swain | Oct. 11, 1910 |
| 1,171,435 | Hinchliffe | Feb. 15, 1916 |
| 1,490,305 | Andrews et al. | Apr. 15, 1924 |
| 1,606,424 | Irgens et al. | Nov. 9, 1926 |

FOREIGN PATENTS

| Number | Country | Date |
|---|---|---|
| 67,407 | Norway | Feb. 7, 1944 |